United States Patent [19]

Nakamura et al.

[11] Patent Number: 5,025,282
[45] Date of Patent: Jun. 18, 1991

[54] COLOR IMAGE FORMING APPARATUS

[75] Inventors: Hiroaki Nakamura; Atsushi Takagi, both of Kanagawa, Japan

[73] Assignee: Fuji Photo Film Co., Ltd., Kanagawa, Japan

[21] Appl. No.: 604,850

[22] Filed: Oct. 29, 1990

[30] Foreign Application Priority Data

Oct. 30, 1989 [JP] Japan .................................. 1-282595

[51] Int. Cl.$^5$ ............................................. G03B 27/80
[52] U.S. Cl. ......................................... 355/38; 355/77
[58] Field of Search ..................... 355/38, 68, 77, 326, 355/327; 356/404, 444; 364/526, 525

[56] References Cited

U.S. PATENT DOCUMENTS 4,830,501 5/1989 Terashita ........................ 356/404 X

FOREIGN PATENT DOCUMENTS 52-23936 8/1977 Japan .
54-28131 2/1979 Japan .
63-187139 8/1988 Japan .
63-187140 8/1988 Japan .

Primary Examiner—L. T. Hix
Assistant Examiner—D. Rutledge
Attorney, Agent, or Firm—Sughrue, Mion, Zinn Macpeak & Seas

[57] ABSTRACT

The improved color image forming apparatus is so designed that the image forming condition computing means having a learning capability, such as a neural network having a back propagation learning algorithm, is caused to learn preliminarily those image forming conditions which are appropriate for the specific type of a documents (e.g. a reflection-type original or a transmission-type original such as a negative film or a reversal film) or the original image carried on the documents such as sea, mountains or a snow scene, examples of such image forming conditions being exposing conditions (e.g. the balance of three primary colors and their densities) and the conditions of developing, fixing and otherwise processing light-sensitive materials, and image is formed on a particular light-sensitive material under the image forming conditions computed by the computing means which has learned said appropriate conditions.

The visible image reproduced with this apparatus always has a good color balance, is free from deterioration of image quality, has none of the unwanted color shades and is optimum for the particular document or original image. As a further advantage, even unskilled users can easily operate this apparatus to reproduce an image that meets the specific preference of the laboratory or the user.

13 Claims, 8 Drawing Sheets

F I G. 3a
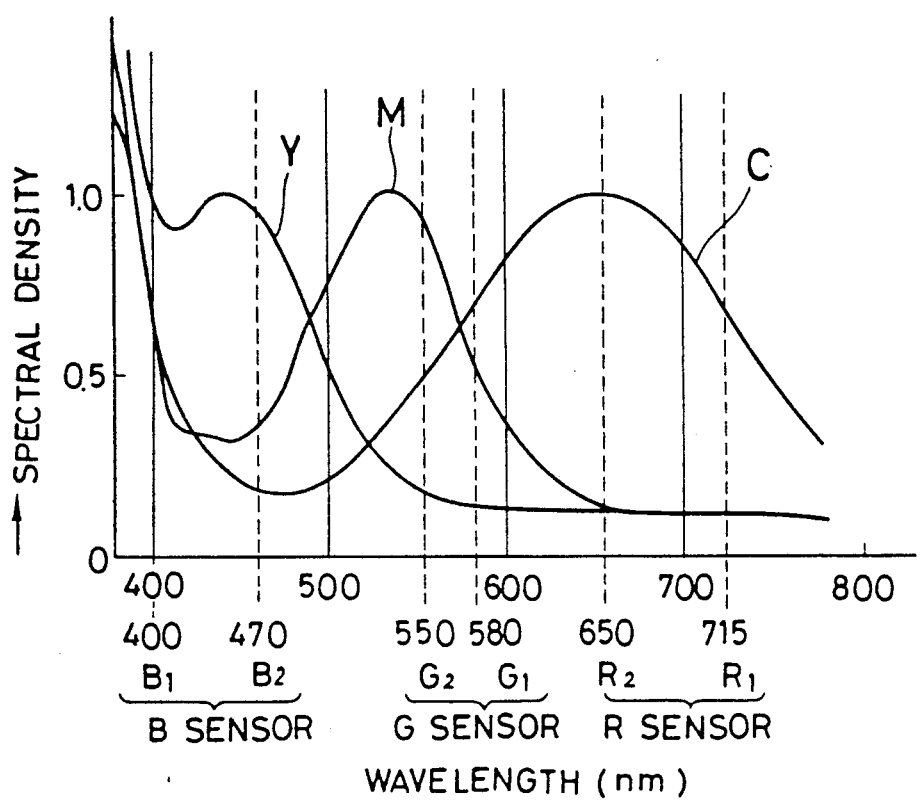
F I G. 3b
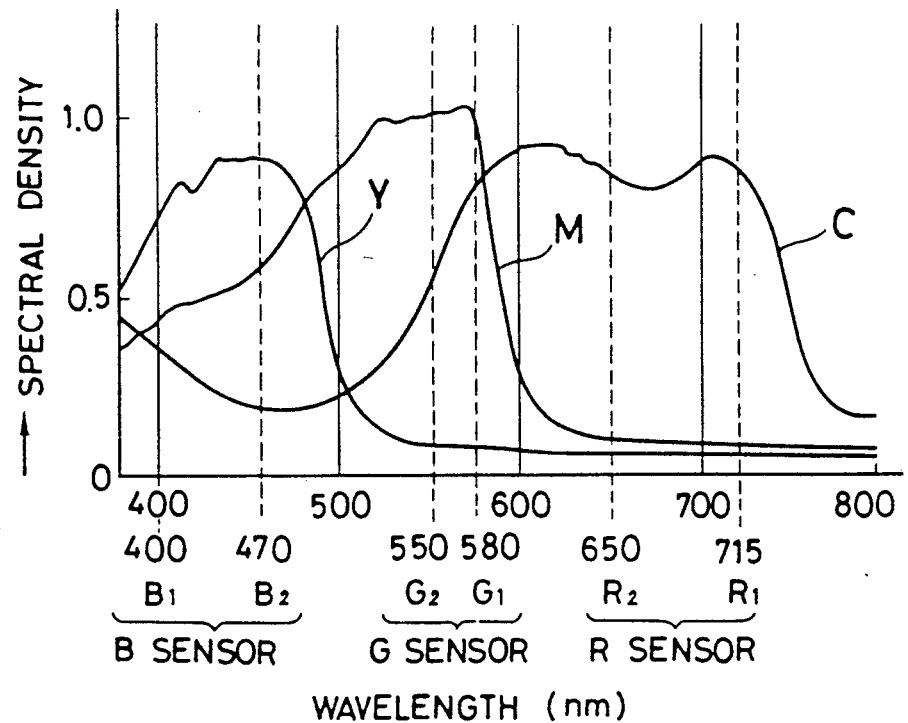

COLOR IMAGE FORMING APPARATUS

BACKGROUND OF THE INVENTION

1. Field of the Invention

This invention relates to a color image forming apparatus such as a color copier or a color printer having a neural network with, for example, a back propagation learning algorithm which, when image forming conditions such as those optimum for a given light-sensitive material are not properly computed on the basis of the original image formation read from the document, provides appropriate image forming conditions to thereby learn the appropriate values of image forming conditions which are associated with said original image formation. Examples of computations that are assisted by such learning capability are the one for distinguishing between documents to be copied such as color photographic documents and color printed documents, and the computation of the exposing conditions in accordance with the specific type of document such as a color negative film, a color reversal film or one carrying an electrically processed image.

2. Description of the Prior Art

Color image forming apparatus including various color copiers and color printers are gaining increasing popularity these days. In order to produce satisfactory color image with these color image forming apparatus, good balance must be attained not only in colors but also in densities.

With most of these color image forming apparatus, in particular, color copiers, photographs and printed matter are used a color originals. However, different colorants are used in photographs and printed matter. Further, they have different spectral luminous efficiencies and require the use of copying materials having different spectral sensitivities. On account of these differences, the images of copies from photographic originals have had a different color balance than those from printed originals if they are duplicated under the same copying conditions. For example, color printed originals have a great overlap between the spectral density distributions of magenta and cyan inks. Thus, color printed originals have a high magenta density and color copiers that are adjusted to produce good copies of color printed originals are to be operated under copying conditions that provide suppressed magenta density. Therefore, if color photographic originals are duplicated under such image forming conditions, the production of magenta color is so limited as to form color copied images of green shades.

To deal with this problem, many methods and means have been proposed for distinguishing between various types of documents. However, the conventional approaches proposed so far require not only complicated techniques of identification but also many discriminant formulas, so they have no been completely satisfactory in terms of the accuracy of identification and the convenience of identifying techniques.

Under these circumstances, the assignee proposed in Japanese Patent Application Kokai Nos. Sho-63-128556, Sho-63-187139 and Sho-63-187140 a method for identifying a specific type of color document by a plurality of discriminant formulas using part or all of the values of measurement with a total of six sensors for the three primary colors, two sensors being assigned to each primary color and having sensitivity peaks at different wavelengths within the wavelength region of the light of one primary color. The assignee further proposed in U.S. Pat. application Ser. No. 07/413,557 an image forming apparatus that is capable of distinguishing color photographic originals at least from color printed originals or black-and-white originals from color documents by a single discriminant function using the values of measurement from the six sensors described above.

Speaking of printers of the type in which color pictures are obtained by printing a positive image on light-sensitive materials of a given size from transmission-type originals such as negative films and reversal films, the individual negative films or reversal films used as original documents are not equal in such conditions as exposing and processing conditions and will suffer from imbalance in colors and densities. Thus, it has been necessary to determine the exposing conditions that are associated with the original image information read from a specific document of interest with a color scanner so that optimum color reproduction can be achieved on the print irrespective of the state of that document (whether it is a negative film or reversal film).

The assignee already proposed methods for determining such appropriate exposing conditions to control the amounts of photographic printing and exposure. Japanese Patent Application Kokai Nos. Sho-52-23936 and Sho-54-28131 describe a method which comprises the steps of measuring the transmission density of a negative film on the basis of a plurality of specified image areas of said negative film, classifying the type of that negative film on the basis of the measured characteristic amounts of image, computing the amount of correction for exposure, and performing photographic printing in the amount of exposure corrected by addition of said computed amount. The assignee also proposed a system named ACCS (advanced computerized color scanner).

The methods the assignee proposed in Japanese Application Kokai Nos. Sho-63-128556, Sho-63-187139 and Sho-63-187140 have the advantage that they insure a higher precision in identifying the type of a specific original document than the prior art while adopting a simple identifying technique and providing ease of control. However, these methods suffer from the disadvantage of requiring a plurality of discriminant formulas.

To solve this problem, the assignee proposed an improved image forming apparatus in U.S. Pat. application Ser. No. 07/413,557. Using a single discriminant function, the improved apparatus automatically distinguishes color photographic originals at least from color printed originals or black-and-white originals and selects the proper image forming conditions (e.g. the amount by which color filters are adjusted and the amount of exposure) and the right kind of light-sensitive material according to the type of the identified color original, to thereby obtain an appropriately reproduced visible image. The precision of identification that can be achieved by this apparatus is very high but not as 100%, so once the discriminant function is set, setting another function is not easy to accomplish because of the need to collect much data and to process it over a prolonged time. To solve this problem, a further improvement in the accuracy of identification and ease of handling have been desired.

According to the methods descried by the assignee in Japanese Patent Application Kokai Nos. Sho-52-23936 and Sho-54-28131, as well as in the ACCS system proposed by the same assignee, various characteristic amounts associated with a plurality of specified image areas ar computed on the basis of photometric data for the light of three primary colors for several hundred pixels that are read from a transmission-type original such as a negative film or a reversal film, and the exposing conditions such as the amount of exposure or the amount of correction for exposure that are necessary for achieving optimum color reproduction on a print can be automatically determined irrespective of the state of the original by a corrective computing procedure using a predetermined statistical technique such as multiple regression analysis. However, the state of transmission-type originals is generally subject to substantial variations and in order to insure that fully appropriate exposing conditions are set according to an individual document to be duplicated, not only a huge amount of data must be stored but also complicated procedures are required to compute the necessary amount of correction using such huge data.

Even if general exposing conditions that are optimum for desired color reproduction are set irrespective of the variations in documents, optimum values for the color balance and density of a visible reproduced image will differ from person to person or are subject to the preference of individuals laboratories. Further, said optimum values will vary depending on the basic tone of a specific object or scene (e.g. a snow scene in a snowy country is rich in white shades whereas a sea in a tropical region is rich in blue shades), so the setting of standard exposure conditions is insufficient and need be modified in different ways depending upon such factors as the site of use. In fact, however, it is extremely cumbersome and difficult to modify the once set value according to each of these requirements.

BRIEF SUMMARY OF THE INVENTION

The principal object, therefore, of the present invention is to solve the aforementioned problems of the prior art by providing a new version of color image forming apparatus. In accordance with the present invention, the setting of image forming conditions on the basis of the original image information of a document, such as the setting of appropriate image forming conditions according to the type of a document to be duplicated such as a color photographic original, a color printed original or a black-and-white original, or the setting of appropriate exposing conditions on the basis of the original image formation of a transmission-type original such as a negative film or a reversal film, is accomplished by a means of computing image forming conditions that is provided with a learning capability, for example, a computing means that automatically generates and sets optimum values using a neural network having a back propagation learning algorithm. In this way, the apparatus of the present invention learns the result of identification of a document of interest or image forming conditions as appropriate for the personal preference, the type of an original to be duplicated (e.g. an object or scene) and the site of machine installation, and not only can the precision of identifying the specific type of a document be improved but also a visible image can be obtained with optimum color reproduction.

In order to attain this object, the present invention provides a color image forming apparatus that comprises an image information detecting means for detecting the original image information carried on a document to be duplicated, a computing means that has a learning capability and which computes image forming conditions as appropriate for a specified light-sensitive material for reproducing a desired image on the basis of said original image information, a color image forming means that allows said light-sensitive material to be exposed under the computed image forming conditions and which processes the exposed light-sensitive material to reproduce a visible image, and an input means which, when said visible image does not reproduce appropriate colors and densities, supplies said computing means with correcting conditions for obtaining the appropriate colors and densities, said computing means being so adapted as to learn the appropriate image forming conditions for the original image information in response to the inputting of said correcting conditions.

Preferably, said computing means includes a neural network which, when said document is a reflection-type original, identifies it either as a color photographic original or as a color printed original on the basis of the original image information as detected from said document by said image information detecting means, and a means for setting said image forming conditions in accordance with the identified type of document, the light-sensitive material used, and the conditions that are added as required.

Preferably, said input means inputs the correct result of document's type identification as said correcting conditions.

Preferably, said computing means includes a neural network which, when said document is a transmission-type original, computes image-related characteristic amounts from the original image information as detected from said document by said image information detecting means and determines said image forming conditions on the basis of said image-related characteristic amounts.

Preferably, said input means inputs said image forming conditions as said correcting conditions.

Preferably, said neural network has a three-layered structure consisting of an input layer into which the parameters computed from said original image information are supplied as input, an intermediate layer, and an output layer from which said image forming conditions are delivered as output.

Preferably, said neural network has a back propagation learning algorithm.

Preferably, said image forming conditions are the amounts by which the three primary colors and their densities are to be corrected.

Preferably, said primary colors are yellow (Y), magenta (M) and cyan (C).

Preferably, said image information detecting means comprises a total of six sensors, with two sensors being assigned to each of the three primary colors and having sensitivity peaks at different wavelengths in the spectral region of said one primary color.

Preferably, said three primary colors for detection are red (R), green (G) and blue (B).

BRIEF DESCRIPTION OF THE DRAWINGS

FIG. 3a and 3b are graphs showing the spectral reflection density, distributions of a color photographic image and a color printed image, respectively;

FIG. 4b is a diagram illustrating an example of the processing element as a component of the neural network shown in FIG. 4a;

DETAILED DESCRIPTION OF THE INVENTION

Figure 1:
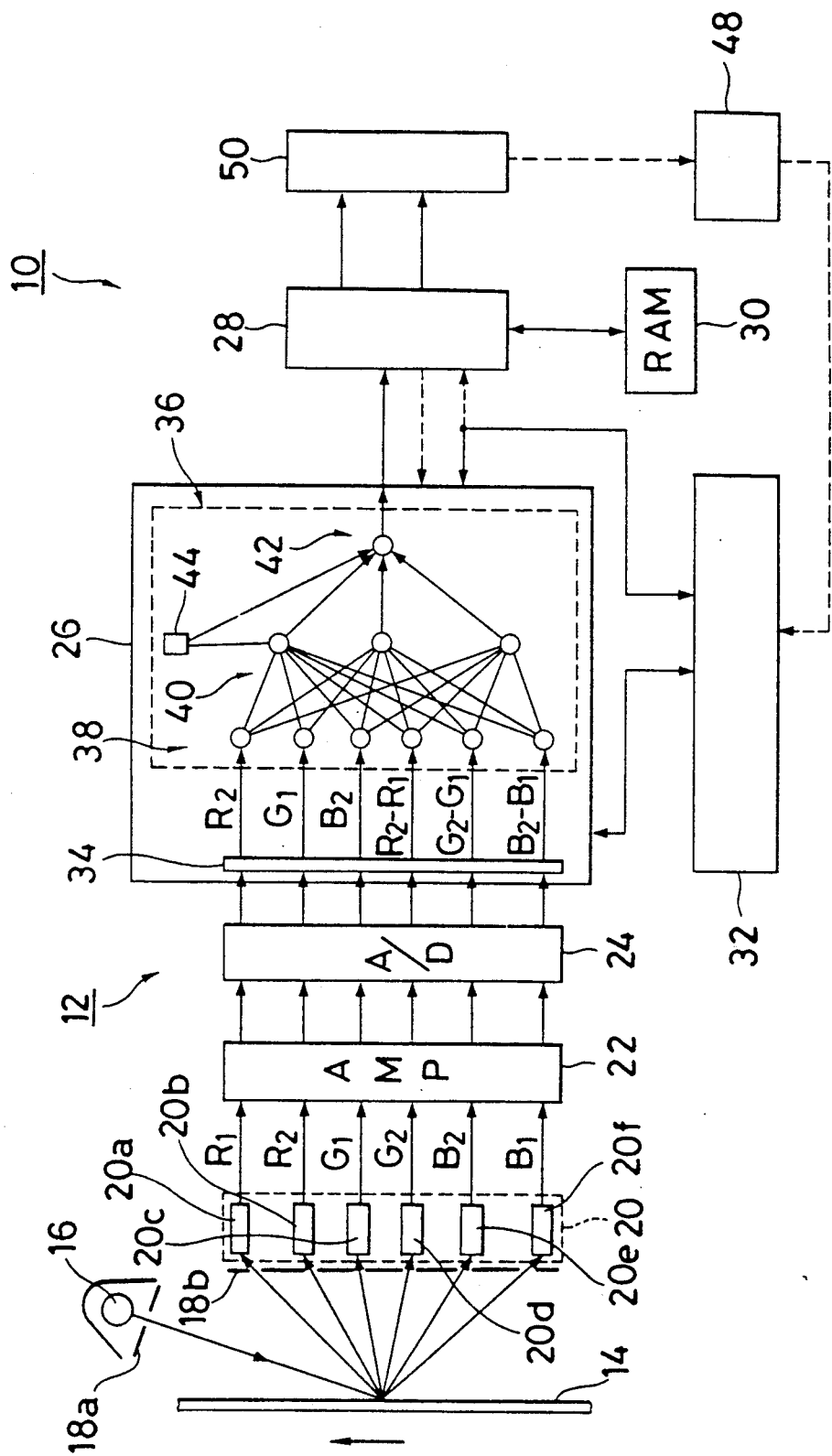
FIG. 1 is a block diagram showing schematically a color image forming apparatus according to an embodiment of the present invention.

The present invention is described hereinafter in detail. In the operation of the color image forming apparatus of the present invention, the original image information is read from all or part of the document's area by the image information detecting means in association with the specific light-sensitive material used. Using the thus detected original image information, the computing means computes appropriate image forming conditions in such a way that it learns input image forming conditions as appropriate for more than one piece of said original image information to generate automatically a computing formula for each of the processing elements of a computing network, which formulas are used to compute invariably appropriate image forming conditions on the basis of newly detected original image formation. The light-sensitive material used is exposed under the computed image forming conditions and the exposed material is processed to reproduce a visible image. Even if the color or density reproduction in the visible image is unsatisfactory, the computing means learns optimum image forming conditions that are supplied to it externally and more exact computing formulas are automatically generated to enhance the efficiency of computing the correct image forming conditions as appropriate for successively detected original image formation. The term "efficiency" as used herein means the probability that the correct or optimum value is computed.

One application of the present invention is to a color copier that is capable of distinguishing between a color photographic original, a color printed original and a black-and-white original and which determines, based on the results of identification of the document's type, those image forming conditions which are associated with the light-sensitive material used (e.g. exposing conditions such as the amount of exposure to the light of each of three primary colors or the amounts of correction and exposure through filters of the three primary colors, or the condition of electrically charging the light-sensitive material used) and the conditions of processing the exposed light-sensitive material. If this color copier is so adapted as to identify the type of a specific document by means of a neural network having a back propagation learning algorithm, the efficiency of document's type identification (i.e., the probability of correctly identifying the type of a specific document) can be improved.

Another application of the present invention is to a color printer that computes amounts that are characteristic of image on the basis of the original image information detected from a transmission-type original such as a negative film or a reversal film and which is capable of determining optimum image forming conditions for the specific light-sensitive material used on the basis of those characteristic amounts. If this color printer is so adapted as to compute the appropriate image forming conditions directly by means of the neural network, not only can the efficiency of computing optimum image forming conditions be enhanced but also the settings of said image forming conditions can be readily modified in accordance with the preference of a specific individual person or laboratory or with the site of printer installation.

The preferred embodiments of the color image forming apparatus of the present invention are described below in detail with reference to the accompanying drawings.

FIG. 1 is a diagram showing schematically the concept of a color image forming apparatus including a unit of computing image forming conditions according to an embodiment of the present invention. The apparatus shown in FIG. 1 uses a total of six photosensors, two being assigned to the light of each of three primary colors, red (R) light, green (G) light and blue (B) light, as the image information detecting means of the present invention. The unit also includes: a document's type identifying unit having a learning capability as the image forming condition computing means of the present invention; a unit for setting appropriate image forming conditions according to the results of identification of the document's type; and unit for inputting the correcting conditions to be learned by said identifying unit.

As shown in FIG. 1, the image forming apparatus of the present invention which is generally indicated by 10 comprises a unit 12 for computing image forming conditions and an image forming unit 50. The computing unit 12 is made of the following components: a light source 16 for illuminating a document 14 making a relative movement in the direction indicated by the arrow; a slit 18a for restricting the illumination from the light source 16; slits 18b for restricting the reflected light from the document 14; an image sensor assembly 20 for receiving the reflected light which is composed of six photosensors, two red (R) sensors 20a and 20b, two green (G) sensors 20c and 20d, and blue (B) sensors 20e and 20f; an amplifier (AMP) 22 for amplifying the respective photometric values from the image sensor 20; an A/D converter (A/D) 24 for performing analog-to-digital conversion of the amplified photometric values; a document's type identifying unit 26 that distinguishes at least between color photographic originals and color printed originals on the basis of the digital image signal and which has the ability to learn in the procedure of document identification; a condition setting means 28 for setting image forming conditions according to the result of identification; a RAM 30 that stores image forming conditions associated not only with the type of a specific document and the light-sensitive material used but also with color densities; and a correcting condition input unit 32 which, when the result of identification is incorrect causing inappropriate image formation, inputs the necessary correcting conditions for learning such as the correct result of identification or the correct image forming conditions. The image forming conditions determined with the computing unit 12 are transmitted to the image forming unit 50 which accordingly exposes and processes the light-sensitive material to reproduce a visible image.

Figure 2:
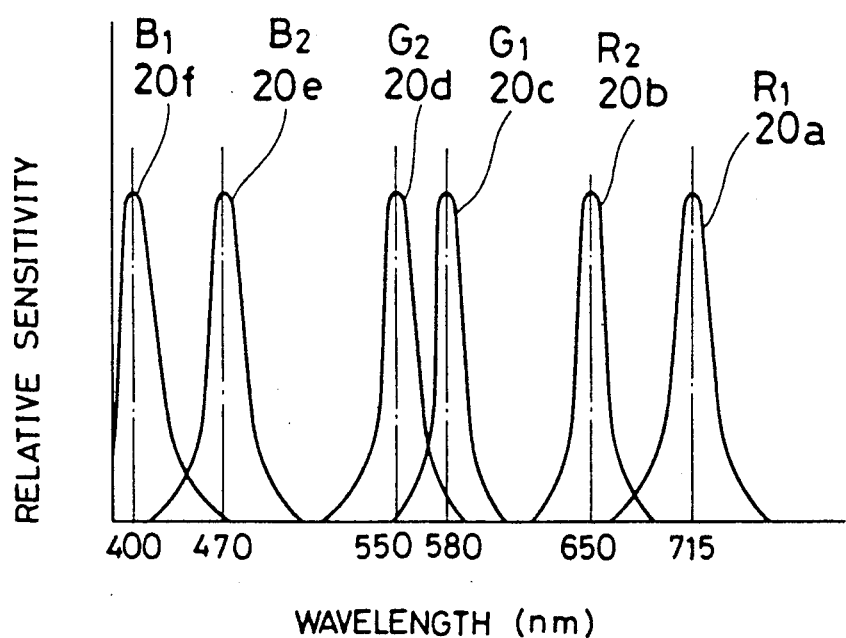
FIG. 2 is a graph showing the sensitivity characteristics of photosensors that are applicable to the color image forming apparatus shown in FIG. 1.

The sensors in the image sensor assembly 20 to be use in the present invention may be of any type as long as they provide parameters that can be used to distinguish at least color photographic originals from color printed originals. Preferably, R sensors 20a and 20b may be those which have sensitivity peaks at 715 nm and 650 nm, respectively, and G sensors 20c and 20d and B sensors 20e and 20f may be those which have sensitivity peaks at 580 nm, 550 nm, 470 nm and 400 nm, respectively, as shown in FIG. 2.

The use of these sensors is justified by the fact that the average spectral density distribution of color photographic images shown in FIG. 3a differs substantially from that of color printed images shown in FIG. 3b at the wavelengths where those sensors have their own sensitivity peaks.

As is clear from FIGS. 3a and 3b, color photographic images have the highest density in the neighborhood of 400 nm and 470 nm. The magenta dye used in color photographic images has a maximum density (maximum absorption wavelength) in the neighborhood of 530 nm whereas the cyan dye has a maximum density of about 650 nm. The cyan and magenta dyes have lower densities on either side of their respective maximum absorption wavelengths. The magenta ink used in color printed images has a maximum density at about 570 nm whereas the cyan ink has a substantially constant density level in the neighborhood of 600-710 nm, with a sharper decrease in density beyond 715 nm than in the case of color photographic images.

In contrast, although not shown, black-and-white images, whether they are photographic or printed, have a substantially constant density level in each of the yellow (400-470 nm), magenta (550-580 nm) and cyan (600-710 nm) ranges.

Thus, by using photometric values $R_1$ and $R_2$ provided from the two sensors 20a and 20b having sensitivity peaks in the wavelength region of R light, photometric values $G_2$ and $G_1$ provided by the two sensors 20c and 20d having sensitivity peaks in the wavelength region of G light, and photometric values $B_2$ and $B_1$ provided by the two sensors 20e and 20f having sensitivity peaks in the wavelength region of B light, at least color photographic images can be clearly distinguished from color printed images.

The document's type identifying unit 26 having a learning capability which is used in the present invention comprises a neural network 36 and a parameter computing unit 34 which computes the parameters to be fed into the neural network 36.

The photometric values $R_1$, $R_2$, $G_2$, $G_1$, $B_2$ and $B_1$ measured with the photosensors 20a-20f are amplified with the amplifier 22 and A/D converted with the A/D converter 24. The parameter computing unit 34 performs mathematical operations on the photometric values to compute the parameters to be fed into the respective processing elements (PE) in the neural network 36. In the example shown in FIG. 1, the parameter computing unit 34 computes six parameters, $R_2$, $G_1$, $B_2$, $R_2-R_1$, $G_2-G_1$ and $B_2-B_1$ on the basis of the aforementioned six photometric values provided from the A/D converter 24. The parameters that can be used in the present invention are in no way limited to those six types and any parameters may be properly selected according to the neural network 36 and the processing elements of which it is composed.

Figure 4A:
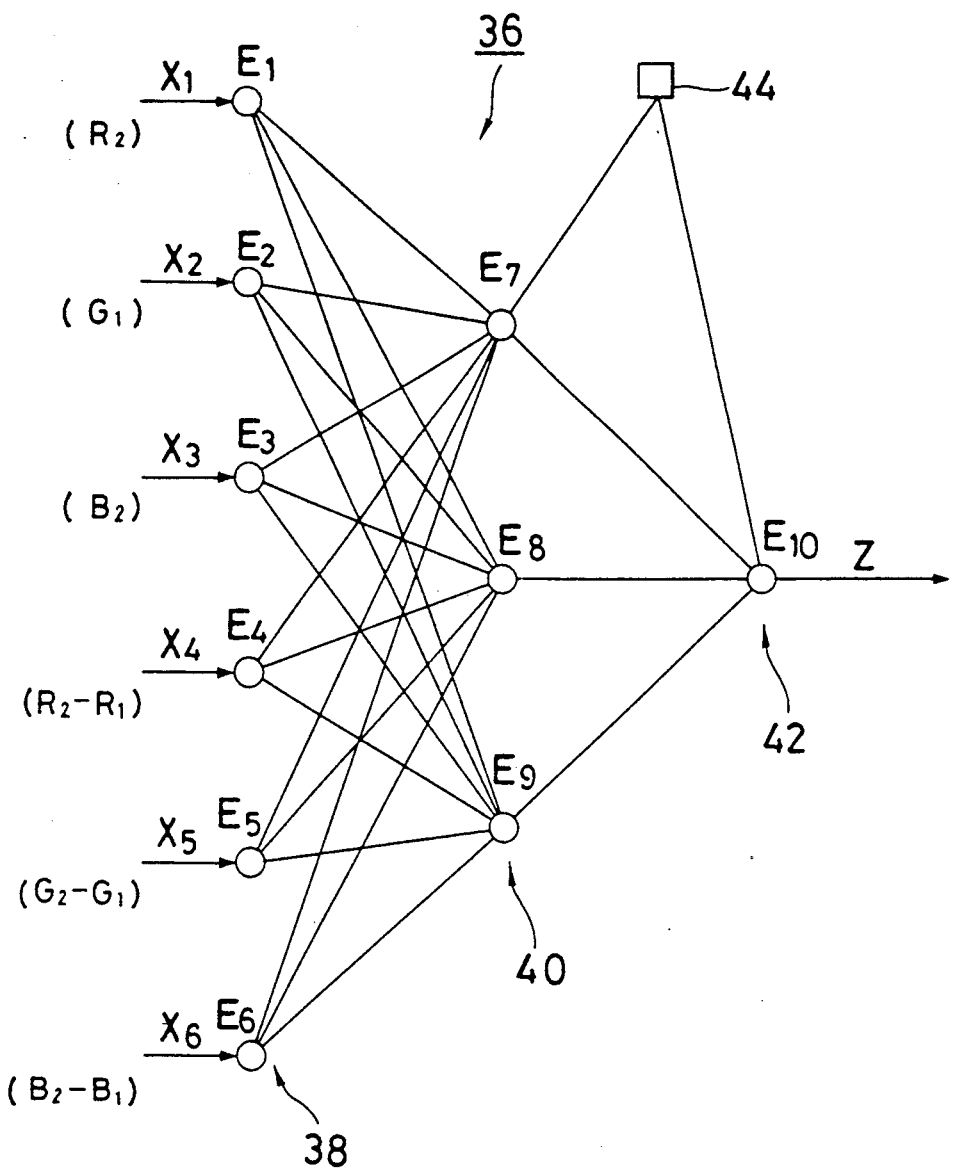
FIG. 4a is a diagram showing schematically the operating principle of an example of the neural network used in the color image forming apparatus shown in FIG. 1.

The neural network 36 is the most characteristic portion of the present invention and, in the example shown in FIGS. 1 and 4a, the network 36 has a three-layered structure consisting of an input layer 38, an intermediate layer 40 and an output layer 42. The input layer 38 consists of six processing elements $E_1-E_6$, the intermediate layer 40 consists of three processing elements $E_7-E_9$, and the output layer 42 consists of a single processing element $E_{10}$. Each of the six elements $E_1-E_6$ in the input layer 38 is linked to every one of the three elements $E_7-E_9$ in the intermediate layer 40, whereas each of those elements $E_7-E_9$ is linked to the element $E_{10}$ in the output layer 42. Both elements $E_7$ and $E_{10}$ are linked to a bias 44 which causes the discrimination output value Z from the element $E_{10}$ to be offset by a predetermined amount.

The neural network is generally defined as an information network that simulates the human brain and is capable of achieving sophisticated parallel decentralized processing through dynamic coupling of a plurality of processing elements that correspond to neurons in the brain.

To mention several characteristics of the neural network, (1) each processing element performs a simple and uniform processing;
(2) each element performs a nonsynchronous processing; and
(3) the network is constructed by changing the strength of coupling between adjacent elements.

The neural network may have a hierarchical structure as shown in FIGS. 1 and 4a, in which all signals are transmitted in one way. Alternatively, it may have a mutually coupled structure in which signals are transmitted randomly between elements.

Figure 4B:
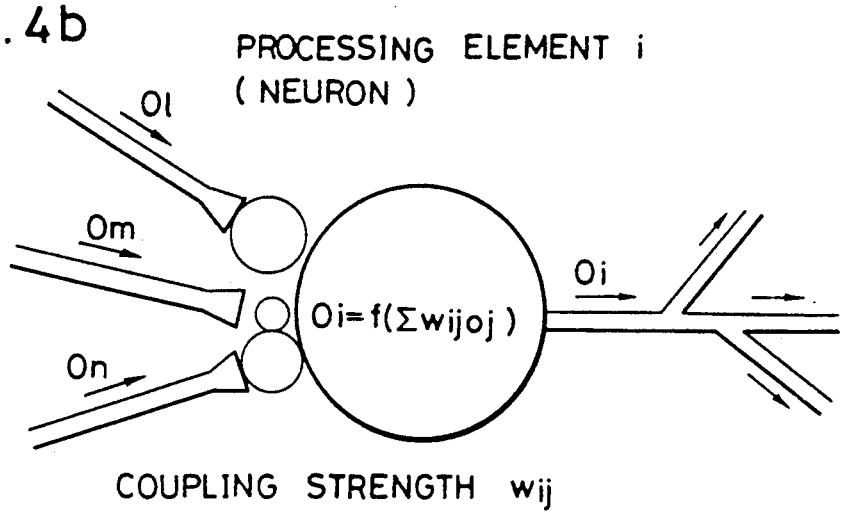

As shown in FIG. 4b, a processing element i is supplied with output signals $O_1$, $O_m$ and $O_n$ from other elements l, m, n, ..., j, ... and the output signal $O_i$ of i is supplied to other elements. If the strength of coupling (weighting coefficient) of elements l, m, n, ..., j, ... to element i is written as $w_{il}$, $w_{im}$, $w_{in}$, ..., $w_{ij}$, ... the input signal $I_i$ to element i can be expressed by:

$$I_i = w_{il}O_l + w_{im}O_m + w_{in}O_n + \ldots + w_{ij}O_j + \ldots$$
$$= \sum_j w_{ij}O_j$$

Thus, the output signal $O_i$ from element i is expressed by:

$$O_i = f(I_i) = f\left(\sum_j w_{ij}O_j\right).$$

The function f(x) may be any suitable threshold function such as a sigmoid function which is expressed by:

$$f(x) = 1/(1+e^{-x}).$$

The neural network can be provided with a learning capability through accommodation of a back propagation (BP). The back propagation (BP) has the following characteristics:

(1) it has a learning capability;
(2) it is closely associated with conventional multivariable analyses including discriminatory analysis; and
(3) a multiple-input and output nonlinear system can be constructed. The amount, $\Delta w$, by which the strength of coupling w (weighting co-efficient) between elements in the neural network is corrected by learning is given by the following equation:

$$\Delta w = -\epsilon(\delta E/\delta w)$$

or, with an attenuation term added:

$$\Delta w = -\epsilon(\delta E/\delta w) + \alpha \Delta w$$

where E is an error evaluation function expressed by $E = (\frac{1}{2})$ $$\sum_c \sum_i$$

$(O_{i,c} - d_{i,c})^2$; $\epsilon$ is a constant; $O_{i,c}$ is the ith unit output; $d_{i,c}$ is a desirable output of the ith unit; c is the cth input/output pair; and $\alpha$ is a smoothing factor. Referring to the example shown in FIG. 4a, if the input signals to elements $E_1-E_6$ in the input layer 38 are written as $x_1-x_6$, they are input parameters $R_2$, $G_1$, $B_2$, $R_2-R_1$, $G_2-G_1$ and $B_2-B_1$.

In the case under consideration, the output signals $y_i$ (i=1-6) from elements $E_1-E_6$ in the input layer 38 are expressed by:

$$y_i = kx_i (i=1-6) \quad (k: \text{scaling coefficient})$$

and those output signals are fed into elements $E_7$, $E_8$ and $E_9$ in the intermediate layer 40. If the strength of coupling (weighting coefficient) between elements $E_1-E_6$ and elements $E_7-E_9$ are written as $w_{ij}$ (i=1-6, j=7-9) and if the input signals and output signals from elements $E_7-E_9$ are written as $y_j$ (j=7-9) and $u_j$ (j=7-9), respectively, the input signal $y_j$ to element $E_j$ is expressed by:

$$y_j = \sum_{i=1}^{6} w_{ij} y_i = \sum_{i=1}^{6} w_{ij} k x_i$$

and, hence, the output signal $u_j$ from element $E_j$ is expressed by:

$$u_j = f(y_j) = f\left(\sum_{i=1}^{6} w_{ij} y_i\right)$$
$$= f\left(\sum_{i=1}^{6} w_{ij} k x_i\right)$$

Further, if the strength of Coupling (weighing coefficient) between elements $E_7-E_9$ in the intermediate layer 40 and element $E_{10}$ in the output layer 42 are written as $w_7$, $w_8$ and $w_9$ whereas the input signal and output signal from element $E_{10}$ are written as u and z, respectively, u and z are expressed by;

$$u = \sum_{j=7}^{9} w_j u_j$$

$$z = f(u) = f\left(\sum_{j=7}^{9} w_j u_j\right) = f\left(\sum_{j=7}^{9} w_j f\left(\sum_{i=1}^{9} w_{ij} k x_i\right)\right).$$

Accordingly, the value of z can be used to identify the type of a specific document. In the case where a sigmoid function $y = f(x) = 1/(1 + e^{-x})$ is used as a threshold function, the discriminatory output value z will indicate that the document of interest is a photographic original if it is close to zero, and the document is identified as a printed original if z is close to unity.

By preliminary learning of a number of data using the above-described back propagation (BP) learning algorithm, the neural network 36 having the construction described above is capable of identifying the correct type of document through determination of the strength of coupling (weighting coefficient) between individual processing elements and the amount by which the discriminatory output value z is offset. Should the result of identification turn out to be inappropriate, the correct result of identification may be supplied from the correcting condition input unit 32 into the neural network 36 so that it is capable of achieving more exact identification of the document type through learning of the input data, whereby the efficiency of document's type identification is markedly improved.

In the example shown in FIG. 1, the document's type identifying unit 26 itself is composed of the neural network 36 so that the type of a specific document is identified by this network. However, this is not necessarily the case of the present invention and identification of the document type may be accomplished by a linear discriminant function, a second- or higher-order discriminant function or a nonlinear discriminant function whereas the coefficients of these functions are determined through learning by the back propagation learning algorithm in the neural network on the basis of a number of data and the appropriate values that are inputted during the procedure of identification.

The learning capability of the document's type identifying unit 26 is in no way limited to the one provided by the neural network and any learning capability that can be used in statistical analyses may be adopted.

The image forming condition setting unit 28 determines image forming conditions such as exposing conditions and processing conditions (e.g. development and fixing conditions) that are optimum for specific combination of a document which has been identified by the unit 26 as a color photographic original, a color printed original or a black-and-white original (which may be more closely identified either as a photographic original or as a printed original) with the light-sensitive material to be used, such as a silver halide photographic material (e.g. a contrasty or normal light-sensitive material which is suitable for use with color printed documents, or a less contrasty or soft light-sensitive material which is suitable for use with color photographic documents) or and OHP light-sensitive material or a negative light-sensitive material (see, for example, U.S. Pat. application Ser. No. 07/413,557).

In the case of direct exposure in which the light of illumination from the light source 16 shown in FIG. 1 that has been reflected by the document 14 is directly used to expose the light-sensitive material, the exposing conditions to be used under given processing conditions may include the amounts by which Y (yellow), M (magenta) and C (cyan) filters and diaphragm stop D ar inserted into the optical path of the reflected light, as well as the amounts of correction, $\Delta Y$, $\Delta M$, $\Delta C$ and $\Delta D$ that are necessary to determine the amounts of insertion of the individual color filters and diaphragm stop that are appropriate for the specific type of a document. Details of the method of setting these exposing conditions are proposed in commonly assigned U.S. Pat. application Ser. No. 07/413,557.

In the case where the image once read is exposed with a light source different from the reading light source, such as a light source composed of R, G and B semiconductor lasers (LD) or a light-emitting diode (LED), the amounts by which the emission from these light sources is to be corrected in terms of intensity and duration may be included in the set of exposing conditions.

In addition to such exposing conditions, those conditions which are associated with the steps of processing light-sensitive materials such as development, bleaching and fixation may also be set.

The conditions that may be set by the unit 28 also include the conditions for exposing other types of light-sensitive materials to be used such as electrophotographic photoreceptors, thermal light-sensitive materials and pressure-sensitive materials, as well as processing conditions peculiar to those non-sliver halide light-sensitive materials, such as the voltage to be applied to electrophotographic photoreceptors.

RAM 30 stores the above-described image-forming conditions, i.e., exposing and processing conditions, in association with the type of a specific document and the light-sensitive material used. Upon receiving certain information about the document type and the light-sensitive material, RAM 30 sends the relevant image forming conditions to the setting unit 28.

When the visible image formed under the exposing conditions (e.g. color balance and density) and the conditions of processing light-sensitive materials as determined by the document's type identifying unit 26 and the condition setting unit 28 does not reproduce an appropriate quality, the correcting condition input unit 32 inputs the appropriate result of identification by the unit 26 or the appropriate image forming conditions provided by the setting unit 28. Such inputting may be performed in various ways; for example, the appropriate result of identification of a document type may be directly fed into the unit 26; alternatively, the appropriate image forming conditions may be first supplied to the unit 28 and the appropriate document type obtained on the basis of those appropriate image forming conditions is supplied from the unit 28 to the document's type identifying unit 26. Whichever method is employed, the unit 26 is capable of learning the appropriate document type to improve the probability that the results of identification are accepted.

The image-forming unit 50 is the portion in which the light-sensitive material used is exposed under the conditions set by the unit 28 and subsequently developed, fixed and otherwise processed under the preset conditions to reproduce a visible image. A suitable type of the image-forming unit may be selected in accordance with the light-sensitive material used.

Figure 5:
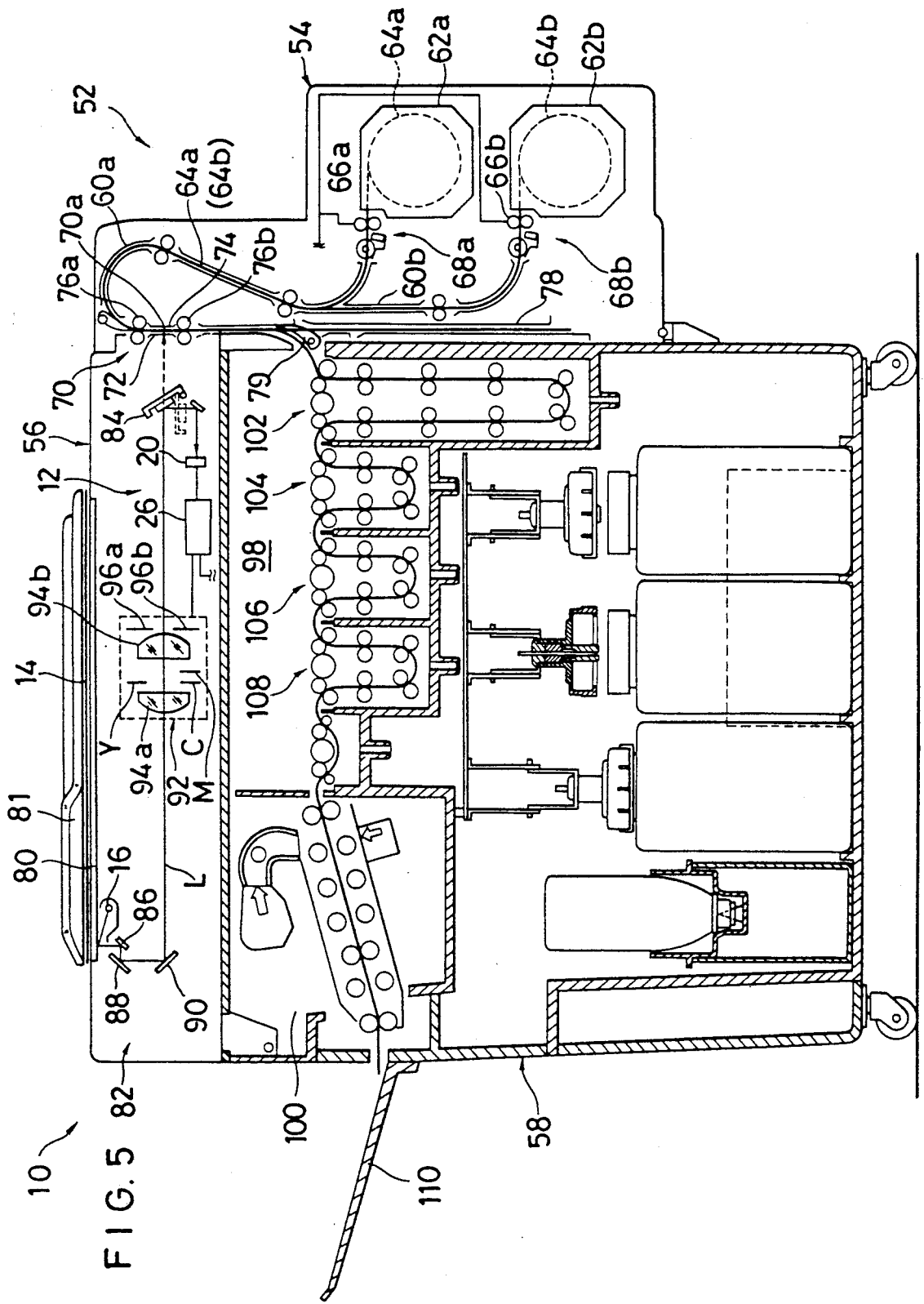
FIG. 5 is a diagrammatic cross-sectional view of a silver halide photographic copier used as the image forming unit of the image forming apparatus of the present invention.

FIG. 5 is a diagrammatic representation of a silver halide photographic copier which is used as the image forming unit 50 of the color image forming apparatus 10 of the present invention. The silver halide photographic copier generally indicated by 52 in FIG. 5 (which is hereinafter referred to simply as copier 52) comprises three basic units 54, 56 and 58. The unit 54 is on the right side and light-sensitive materials are supplied therefrom; the unit 56 in the upper part of the copier 52 is an exposing unit; and the unit 58 in the lower part is a processing unit.

The unit 54 has passageways 60a and 60b for the transport of light-sensitive materials, with two magazines 62a and 62b being detachably disposed one on the other. Rolls of light-sensitive materials 64a and 64b are accommodated within the respective magazines and may be unwound to have their leading edges emerge to the associated passageways in the unit 54. To take an example, the light-sensitive material 64a may be a contrasty one which is optimal for copying color printed documents, and the light-sensitive material 64b may be a soft one which is optimal for copying color photographic documents.

Rollers 66a and 66b for withdrawing the light-sensitive materials 64a and 64b are disposed ahead of the magazines 62a and 62b, respectively, and provided further ahead are cutters 68a and 68b for cutting the light-sensitive materials 64a and 64b to predetermined lengths. Cut lengths of the light-sensitive materials 64a and 64b are so adapted that they are guided to an exposure section 70 by means of guides and transport roller pairs in the passageways 60a and 60b.

The exposure section 70 is where the exposing position 70a (exposure plane) of the light-sensitive material 64a or 64b is defined and it comprises a glass plate 72 fixed in such a way that a plate 74 is pressed against this glass plate 72.

A transport roller pair 76a and another transport roller pair 76b are disposed upstream (in the upper part) and downstream (in the lower part), respectively, of the exposure section 70.

Below the exposure section 70 is situated a passageway 78 that holds temporarily the exposed light-sensitive material 64a (or 64b) in a downward vertical direction. Halfway down the passageway 78 is provided a switching guide 79 which changes the transport of the light-sensitive material 64a (or 64b) to be directed to the processing unit 58.

The exposing unit 56 comprises the following components: a platen 80 typically made of a transparent glass plate on which a document to be copied 14 is to be placed; a top cover 81 for holding the document 14 in proper position on the platen 80; an imaging optical means 82 with a movable light source that applies the image on the platen 80 onto the light-sensitive material 64a (or 64b) in the exposure section 70 by slit scanning and exposure; the means 12 of computing image-forming conditions that includes the image sensor assembly 20 for measuring the reflection density of the reflected light from the document 14 during prescanning, and the unit 26 for identifying the type of document 14 on the basis of the values of measurement with the image sensor assembly 20; and a shutter 84 which acts on the optical path L of the reflected light to connect it to either the exposure section 70 or the image sensor assembly 20. The imaging optical means 82 is composed of a light source unit having a light source 16 for scanning the underside of the platen 80 and a reflecting mirror 86, mirrors 88 and 90 which move in the same direction as the light source unit at a speed one half the scanning speed so as to allow the light from the light source 16 to be reflected in a given direction, and a lens unit 92.

The lens unit 92 has a front lens group 94a and a rear lens group 94b for allowing the reflected light from the document 14 to focus on the exposing position 70a, a cyan filter C, a yellow filter Y and a magenta filter M used to perform color correction on the reflected light and which correspond to cyan, yellow and magenta colors, respectively, and plates 96a and 96b making up a movable diaphragm stop for correcting the quantity of the reflected light.

In the copier 52 of the present invention, the lens unit 92 adjusts the quantity and color balance of the reflected light under the image forming conditions (exposing conditions) that are set by the unit 28 on the basis of the discriminatory signal from the document's type identifying unit 26.

This correction of reflected light is performed in the following manner. If the use selects the contrasty light-sensitive material 64a and if the document 14 is identified either as a color printed original or a black-and-white original, copying is effected under standard conditions that have been set for the reproduction of contrasty image. However, if the document 14 is identified as a color photographic original, the standard conditions are corrected in such a way that the yellow filter Y is removed to increase the quantity of light. If the user selects the soft light-sensitive material 64b and if the document 14 is identified as a color photographic original, copying is effected under standard conditions that have been set for the reproduction of soft image. However, if the document 14 is identified either as color print or as a black-and-white original, the standard conditions are corrected in such a way that the cyan filter C is inserted.

The imaging optical means 82 used in the copier 52 is so designed as to perform zooming up to a magnification of 0.5–2.0.

The shutter 84 serves to change the optical path L of the reflected light in prescanning and exposing modes. In the prescanning mode, the shutter 84 is closed as indicated by the solid line in FIG. 5 and the optical path L of the reflected light is connected to the image sensor assembly 20. In the exposing mode, the shutter 84 is opened as indicated by the dashed line and the reflected light is allowed to expose the light-sensitive material 64a (or 64b).

The processing unit 58 is basically composed of a processing zone 98 and a drying zone 100. The processing zone 98 contains in it a sequence of a developing tank 102, a bleach-fixing tank 104 and washing tanks 106 and 108, and the light-sensitive material 64a (or 64b), after being developed, bleached, fixed and rinsed with the processing solutions in these tanks, is sent to the drying zone 100. The drying zone 100 is so constructed that the rinsed light-sensitive material 64a (or 64b) is dried and hereafter sent to a receiving tray 110.

Using the color image forming apparatus 10 shown in FIG. 1, the type of the document 14 was identified and the result was compared with the result of document's type identification that was effected in the image forming apparatus described in commonly assigned U.S. Pat. application Ser. No. 07/413,557 which identifies the type of a specific document using a linear discriminant function.

Figure 6:
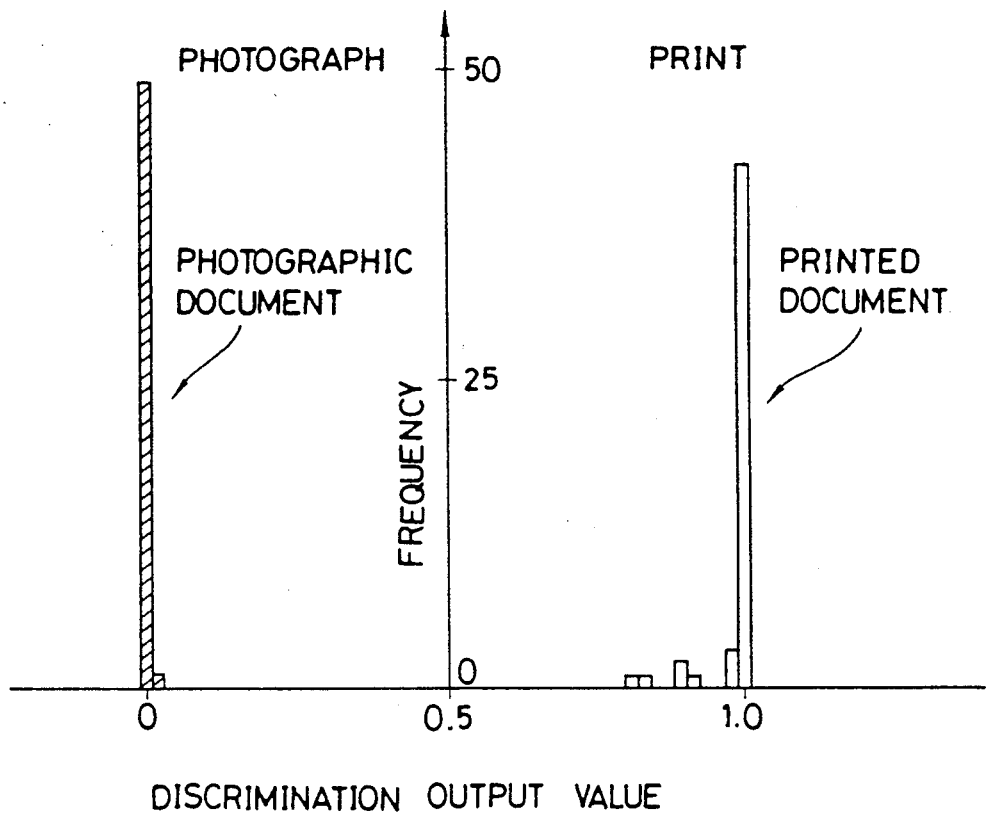
FIG. 6 is a graph showing the results of identifying the type of documents with the color image forming apparatus shown in FIG. 1.

The documents the type of which was identified by the apparatus of the present invention consisted of 50 samples of color photographic original and 50 samples of color printed original. Through preliminary learning by the neural network 36 having a back propagation learning algorithm, an optimum nonlinear discriminant function (containing weighting coefficients and the amount of offset of z) was generated automatically and the document's type identifying unit 26 used the so generated function to identify the type of each of the 100 document samples. The results are shown in FIG. 6.

As a comparison, the linear discriminant function proposed in commonly assigned U.S. Pat. application Ser. No. 07/413,557 was used to identify the type of the same 100 document samples. To state more specifically, the following linear discriminant function $Z_L$ was used:

$$Z_L = a_1 + a_2 {}^* R_2 + a_3 {}^* G_1 + a_4 {}^* B_2 = a_5 {}^* (R_2 - R_1) + a_6 {}^* (G_2 - G_1) + a_7 {}^* (B_2 - B_1)$$

$$a_1 = -14.33, a_2 = -0.11, a_3 = -0.37,$$

$$a_4 = 0.45, a_5 = 1.19, a_6 = -0.67,$$

$$a_7 = -0.96.$$

If ZL<O, the document of interest was identified as a color printed original, and if ZL>O, the document was identified as a color photographic original. The results of the comparative test are shown in FIG. 7.

Figure 7:
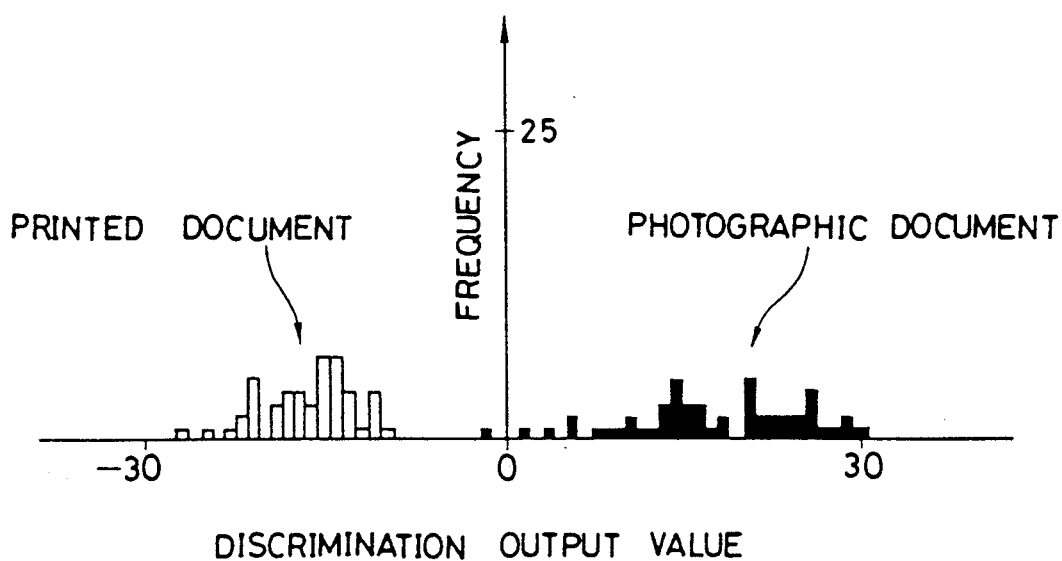
FIG. 7 is a graph showing the results of identifying the type of documents with a prior art color image forming apparatus.

As is clear from FIGS. 6 and 7, when identification was performed using the linear discriminant function, occasional errors occurred or two documents could be distinguished only insufficiently when $Z_L$ was near zero; on the other hand, when the documents were identified using the neural network 36 of the present invention which had a learning capability, not a single error occurred and every two documents could be distinguished with an extremely high level of accuracy.

The foregoing description concerns the case where the document's type identifying unit is provided with a learning capability by constructing a neural network in order to compute and set the appropriate image forming conditions. If desired, image forming conditions such as the exposing conditions [e.g. the color balance between C, M and Y and the density (D)]and processing conditions may be directly determined from the original image information using the image forming condition computing means having a learning capability. The original image information is such that it is detected from the document by means of an image information detector such as an image sensor assembly and may be exemplified by the values of measurement with the six photosensors described herein. In the case of a copier, this alternative approach would be as follows: the neural network is caused to learn the correlation between the documents and the conditions of copying (color balance and density) by a skilled operator in terms of the relationship between the photosensor output for each document and the copying conditions and, by so doing, copying conditions as appropriate for a specific document to be copied can be directly obtained with high precision (i.e., the probability that correct identification can be achieved is high).

Figure 8:
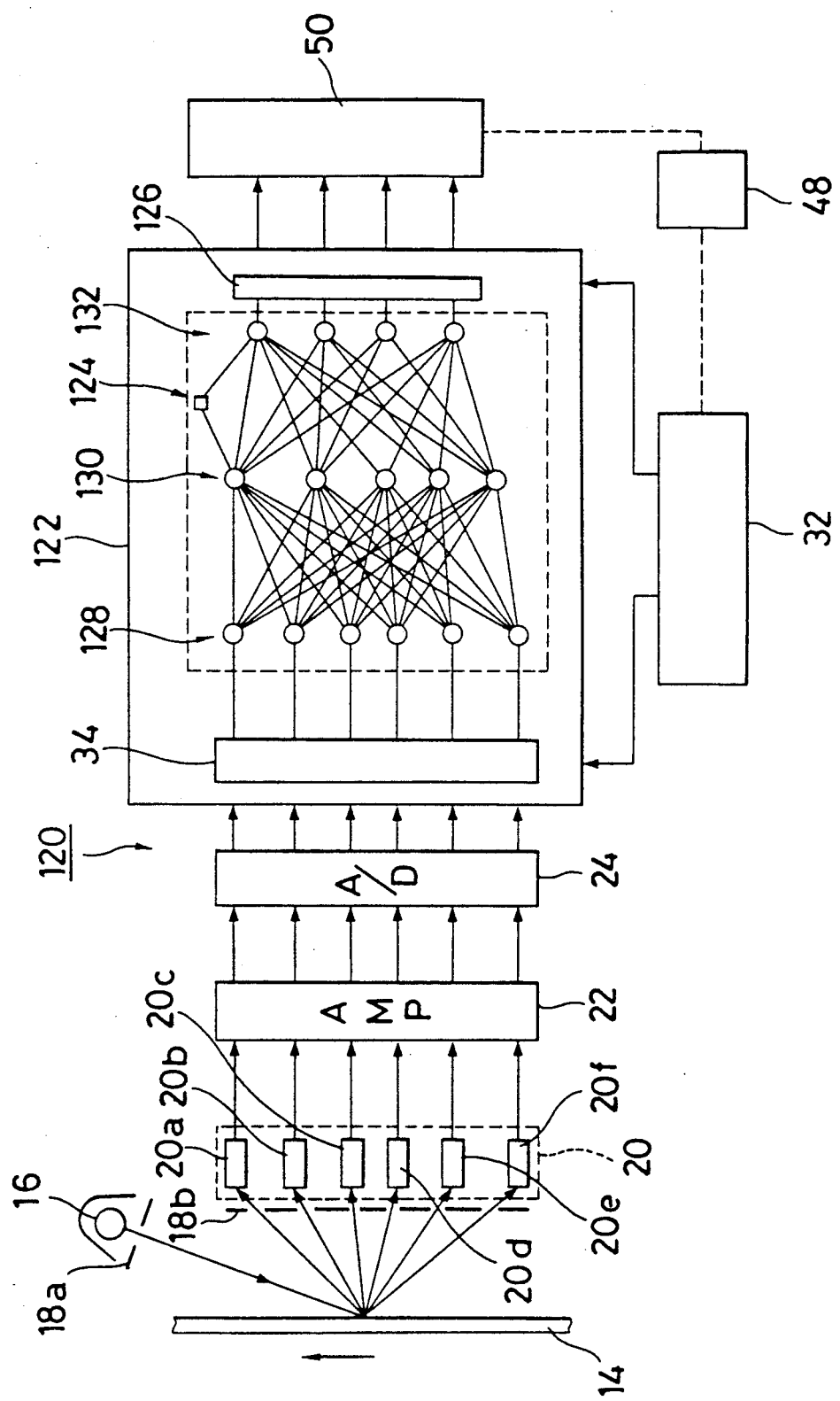
FIGS. 8 and 9 are block diagrams showing schematically color image forming apparatuses according to other embodiments of the present invention.

FIG. 8 shows schematically a color image forming apparatus that is operated on the principle of this second approach. The color image forming apparatus generally indicated by 120 in FIG. 6 comprises a light source 16, an image sensor assembly 20, an amplifier 22, an A/D converter 24, a correcting condition input means 32, an image forming condition computing unit 122 having a learning capability, and an image forming unit 50. Except the image forming condition computing unit 122, the components of the apparatus 120 are identical to those shown in FIG. 1 and need not be described in detail.

The image forming condition computing unit 122 has a parameter computing means 34 which is the same as that shown in FIG. 1, a neural network 124, and an output port 126, and it determines the conditions for three color filters Y, M and C and the density-related condition for diaphragm stop D directly on the basis of the photometric values $R_1$, $R_2$, $G_1$, $G_2$, $B_1$ and $B_2$ provided by the six photosensors 20a–20f. The neural network 125 has a three-layered structure in which an input layer 128 is composed of six processing elements, an intermediate layer 130 is composed of five elements, and an output layer 132 is composed of our elements associated with Y, M, C and D.

The formula describing the relationship between an input and an output signal from each of those elements, the strength of coupling (weighting coefficient) between the elements in two layers, the construction of the neural network 124 having a back propagation learning algorithm which is composed of those elements, and the automatic generation of a nonlinear computing (discrimination) function from the neural network 124 through learning may be considered in the same way as described for the example shown in FIGS. 4a and 4b and, hence, need not be discussed in detail.

By properly modifying the structure of the neural network 124, the image forming condition computing unit 122 may be adapted to set image forming conditions that are appropriate for transmission-type originals including negative films and reversal films.

Figure 9:
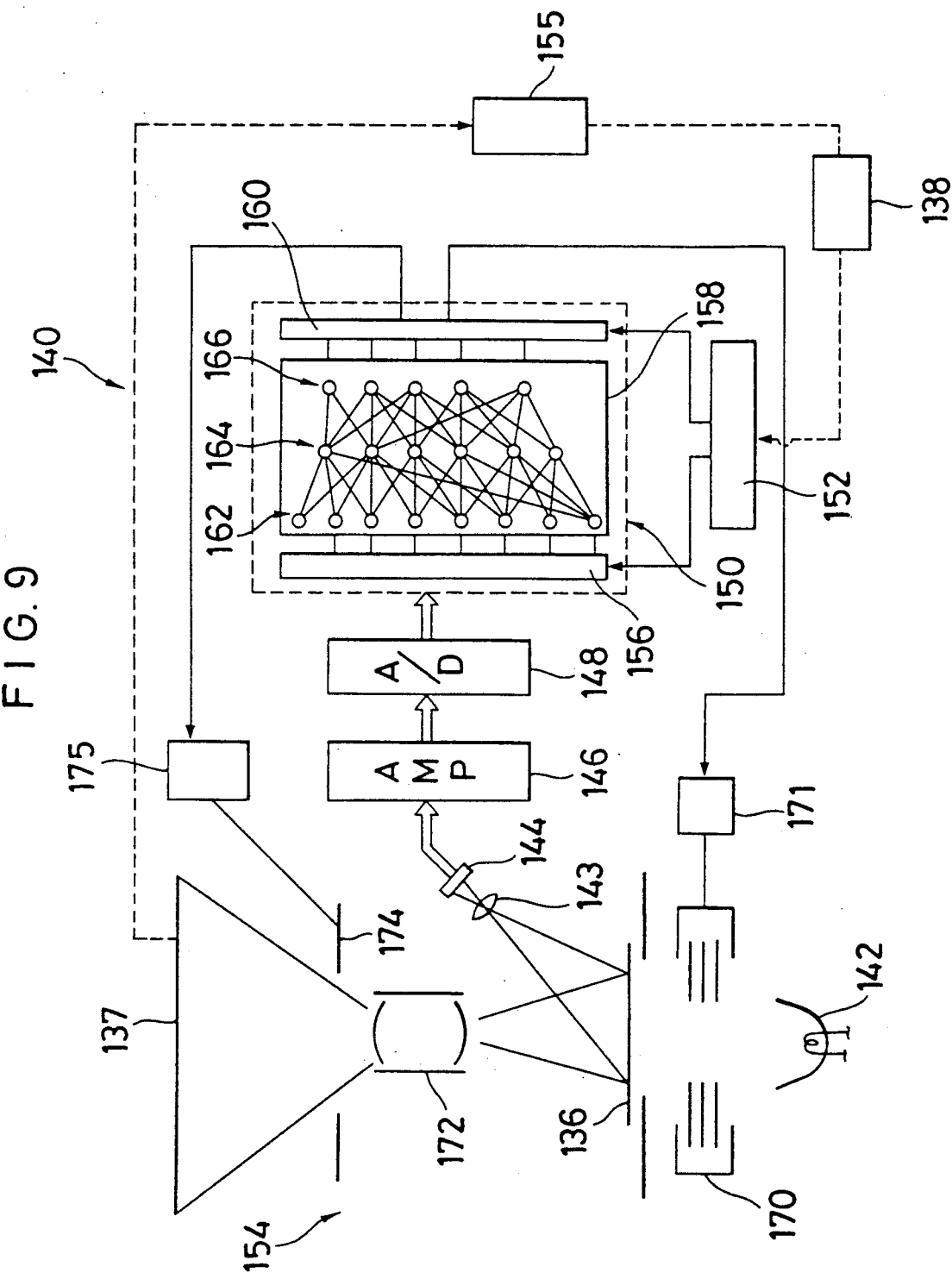

FIG. 9 shows schematically a color photographic printer which is used to produce an optimum color picture from a negative film. The color photographic printer generally indicated by 140 in FIG. 9 comprises the following components: a light source 142 for illuminating a negative film 136; a lens 143 that condenses the light emitted from the light source 142 and which transmits the negative film 136; a color MOS sensor 144 that detects the condensed light of transmission, typically in an amount corresponding to 25×25 pixels; an amplifier 146; an A/D converter 148; a printing condition computing unit 150; a correcting condition input unit 152, an exposure unit 154 forming the main body of the printer, and a processing unit 155 which processes an exposed light-sensitive material 137 to reproduce a color picture 138.

The printing condition computing unit 150 comprises: a characteristic amount computing means 156 which computes a number of image-related characteristic amounts on the basis of the values of measurement with a number of photosensors in the image sensor assembly 144 that are associated with the original image information carried on the negative film 136; a neural network 158 having a back propagation learning algorithm; and an output port 160 which outputs printing conditions, for example, exposing conditions related to the color balance between Y, M and C and the density (D). The neural network 158 has a multi-layered structure consisting of an input layer 162 composed of a number of processing elements, a simplex or multiplex intermediate layer 164 composed of a number of elements, and an output layer 166 that is composed of our elements related to the printing conditions (e.g. Y, M, C, and D) and which determines appropriate printing conditions.

The processing elements, nonlinear computing (discrimination) function and neural network used in the embodiment under consideration can be constructed by the same methods as already described hereinabove and they are such that at least the four printing conditions (Y, M, C and D) can be generated automatically by either a linear or a nonlinear computing function.

The light source 142 is preferably used not only for the color MOS sensor 144 to read the image information on the negative film 136 for setting appropriate printing conditions but also for the exposing unit 154 to expose (print) said image information on the light-sensitive material 137. Needless to say, different light sources may be used for reading and exposing purposes.

The color MOS sensor 144 reads the image information on the negative film 136, with a number of pixels being taken as a group. Any known color sensors can be used as long as they are capable of detecting image information as a group of many pixels from transmission-type originals such as negative films and reversal films. The number of pixels to be read is in no way limited to the aforementioned array of 25×25 pixels and may be properly selected depending upon the size of transmission-type originals (e.g. negative films) or the information necessary for detection. Other patterns of pixels that can be read include an array of 20×13 pixels and an array of 72×48 pixels.

The amplifier 146 and A/D converter 148 may be of any known versions that are conventionally used in color photographic printers.

The correcting condition input unit 152 is for the user to supply the printing condition computing unit 150 with the data that is to be preliminarily learned by said unit or for the user to input the appropriate correcting conditions if the finished color picture 138 is not found to have been appropriately printed. These inputs can be supplied by any method as long as the data inputted by operation of conventional manual or automatic keys for correcting the color balance and density can be fed back to the printing condition computing unit 150.

The exposing unit 154 exposing negative prints comprises basically the light source 142, a color filter assembly 172, a printing lens 172 and a shutter 174. The color filter assembly 170 and the shutter 174 have their own drive units 171 and 175 and are capable of being automatically adjusted according to the four printing conditions (Y, M, C and D) generated by the computing unit 150. The color filter assembly 170 is composed of filter plates of three colors, 170Y, 170M and 170C, which can be automatically adjusted by the drive unit 171 in accordance with the filter conditions Y, M and C among the four printing conditions. The shutter 174 is opened or closed for a predetermined time by means of the drive unit 175 so as to provide a predetermined amount of exposure in accordance with the density condition D among the four printing conditions. Needless to say, the color filter assembly 170 and the shutter 174 may be manually adjusted to the settings of the four printing conditions (Y, M, C and D).

Based on the image information already read from the negative film 136, the exposing unit 154 adjusts the color filter assembly 170 and the shutter 174 to satisfy the printing conditions set by the computing unit 150; it then enlarges the image on the negative film 136 to a predetermined size by means of the printing lens 172 so that it is exposed on the light-sensitive material 137.

The processing unit 155 develops, bleaches, fixes, washes and dries the exposed light-sensitive material 137 to produce a color picture (print) 138 using processing solutions, agents and methods as appropriate for the light-sensitive material used.

In conventional color image formation from transmission-type originals including negative films and reversal films, image-related characteristic amounts computed from photometric values as detected with the color MOS sensor 144 are processed by statistical procedures such as multiple regression analysis to compute the necessary printing conditions. Compared with this prior art technique, the color photographic printer 140 is capable of setting printing conditions with a sufficiently higher precision to increase the probability that acceptable print images are reproduced.

Further, the color photographic printer 140 of the present invention has a learning capability, so by learning various kinds of data including the type of objects in negative films or reversal films, the site of machine installation (i.e., whether it is snowy, tropical, urban or mountaineous) and the preference of a specific laboratory or user, this printer, even if it is operated under preset standard or typical printing conditions, is capable of forming with increased probability those print images which comply with the user's need.

While the color image forming apparatus of the present invention has the construction described above, it should be noted that this is not the sole embodiment of the present invention and that various improvements are possible without departing from the spirit and scope of the invention. For instance, and image information that can be detected and read may be used as original image information and illustrative examples are the image information carried on reflection-type originals, transmission-type originals and that which is displayed or synthesized by various image processing devices that do not take on the form of documents to be copied, such as TV sets, video equipment and computer graphic devices. Further, using these kinds of original image information, the apparatus of the present invention is capable of reproducing a visible image not only on silver halide photographic materials but also on other types of light-sensitive materials including pressure-sensitive materials, photopolymers, electrophotographic photoreceptors and thermal light-sensitive materials. The apparatus can also be applied to reproduction of visible image by various methods including ink-jet recording and diffusion transfer.

As described on the foregoing pages, the color image forming apparatus of the present invention is so designed that the image forming condition computing means having a learning capability is caused to learn preliminarily those image forming conditions which are appropriate for the specific type of documents or the original image information carried on the document, such as exposing conditions (e.g. the color balance of three primary colors and their densities) and the conditions of developing, fixing and otherwise processing light-sensitive materials, and image is formed on a particular light-sensitive material under the image forming conditions computed by the computing means which has learned said appropriate conditions. This insures the consistent reproduction of satisfactory visible image that is free from deterioration of color balance and image quality and which has none of the unwanted color shades. In the case where the type of a specific document is identified by means of a neural network to set image forming conditions that are appropriate for the identified documents type, the precision of identification can be sufficiently improved to insure the reproduction of acceptable images in an increased yield. In the case where image-related characteristic amounts are read from transmission-type originals such as negative films and reversal films and used by a neural network to directly set image forming conditions, the neural network is always caused to learn optimum image forming conditions irrespective of the state of a specific transmission-type original whereby the precision of computing appropriate image forming conditions can be sufficiently improved to insure the reproduction of acceptable images in an increased yield.

Hence, the color image forming apparatus of the present invention is capable of learning optimum image forming conditions that ar appropriate for the type of a specific document, the original image, say, the scene or object, on the document, the site of machine installation or the preference of a specific laboratory or user, and the image forming conditions that comply with these needs can be computed with high precision even if the apparatus is initially set to compute typical or standard image processing conditions.

A further advantage of the color image forming apparatus of the present invention is that the results described above can be achieved even by unskilled operators through easy and simple procedures.

What is claimed is:

1. A color image forming apparatus that comprises:
    an image information detecting means for detecting a original image information carried on a document to be duplicated;
    a computing means that has a learning capability and which computes image forming conditions as appropriate for a specified light-sensitive material for reproducing a desired image on the basis of said original image information;
    a color image forming means that allows said light-sensitive material to be exposed under the computed image forming conditions and which processes the exposed light-sensitive material to reproduce a visible image; and
    input means which, when said visible image does not reproduce appropriate colors and densities, supplies said computing means with correcting conditions for obtaining the appropriate colors and densities,
    said computing means being so adapted as to learn the appropriate image forming conditions for the original image information in response to the inputting of said correcting conditions.

2. A color image forming apparatus according to claim 1 wherein said computing means includes a neural network which, when said document is a reflection-type original, identifies it either as a color photographic original or as a color printed original on the basis of the original image information as detected from said document by said image information detecting means, and a means for setting said image forming conditions in accordance with the identified type of document, the light-sensitive material used, and the conditions that are added as required.

3. A color image forming apparatus according to claim 2 wherein said input means inputs the correct result of document's type identification as said correcting conditions.

4. A color image forming apparatus according to claim 2 wherein said neural network has a three-layered structure consisting of an input layer into which the parameters computed from said original image information are supplied as input, an intermediate layer, and an output layer from which said image forming conditions are delivered as output.

5. A color image forming apparatus according to claim 2 wherein said neural network has a back propagation learning algorithm.

6. A color image forming apparatus according to claim 1 wherein said computing means includes a neural network which, when said document is a transmission-type original, computes image-related characteristic amounts from the original image information as detected from said document by said image information detecting means and determines said image forming conditions on the basis of said image-related characteristic amounts.

7. A color image forming apparatus according to claim 6 wherein said input means inputs said image forming conditions as said correcting conditions.

8. A color image forming apparatus according to claim 6 wherein said neural network has a back propagation learning algorithm.

9. A color image forming apparatus according to claim 6 wherein said neural network has a three-layered structure consisting of an input layer into which the parameters computed from said original image information are supplied as input, an intermediate layer, and an output layer from which said image forming conditions are delivered as output.

10. A color image forming apparatus according to claim 1 wherein said image forming conditions are the amounts by which the three primary colors and their densities are to be corrected.

11. A color image forming apparatus according to claim 10 wherein said primary colors are yellow (Y), magenta (M) and cyan (C).

12. A color image forming apparatus according to claim 1 wherein said image information detecting means comprises a total of six sensors, with two sensors being assigned to each of the three primary colors and having sensitivity peaks at different wavelengths in the spectral region of said one primary color 13. A color image forming apparatus according to claim 12 wherein said three primary colors for detection are red (R), green (G) and blue (B).

* * * * *